Figure 4:
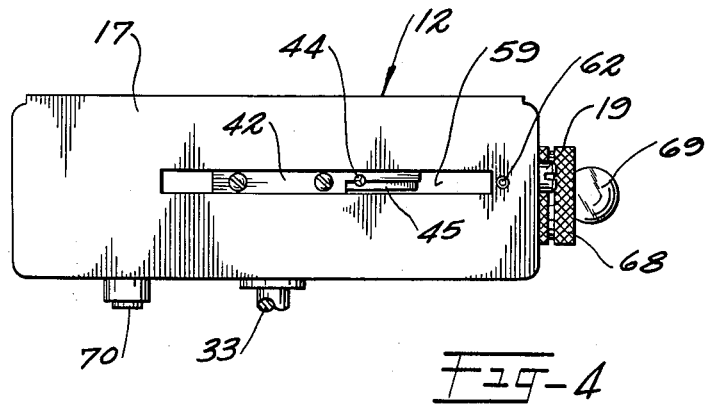

Feb. 20, 1962 B. R. HAUEISEN 3,021,707
COATING SCRATCH RESISTANCE INDICATOR
Filed Jan. 12, 1959 3 Sheets-Sheet 1
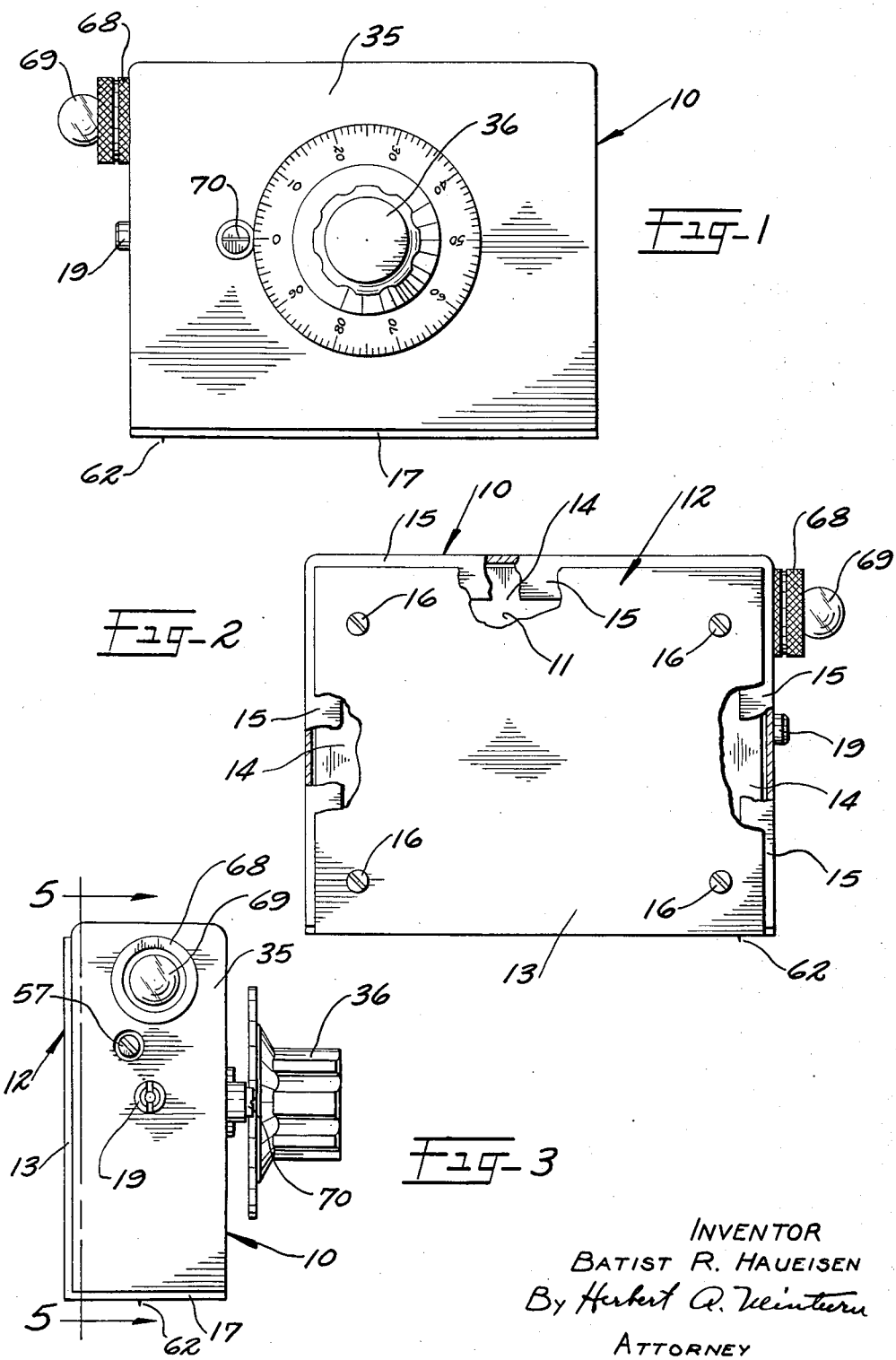
INVENTOR
BATIST R. HAUEISEN
By Herbert Q. Weinturn
ATTORNEY Feb. 20, 1962 B. R. HAUEISEN 3,021,707
COATING SCRATCH RESISTANCE INDICATOR
Filed Jan. 12, 1959 3 Sheets-Sheet 2

INVENTOR
BATIST R. HAUEISEN
By Herbert Q. Minturn
ATTORNEY

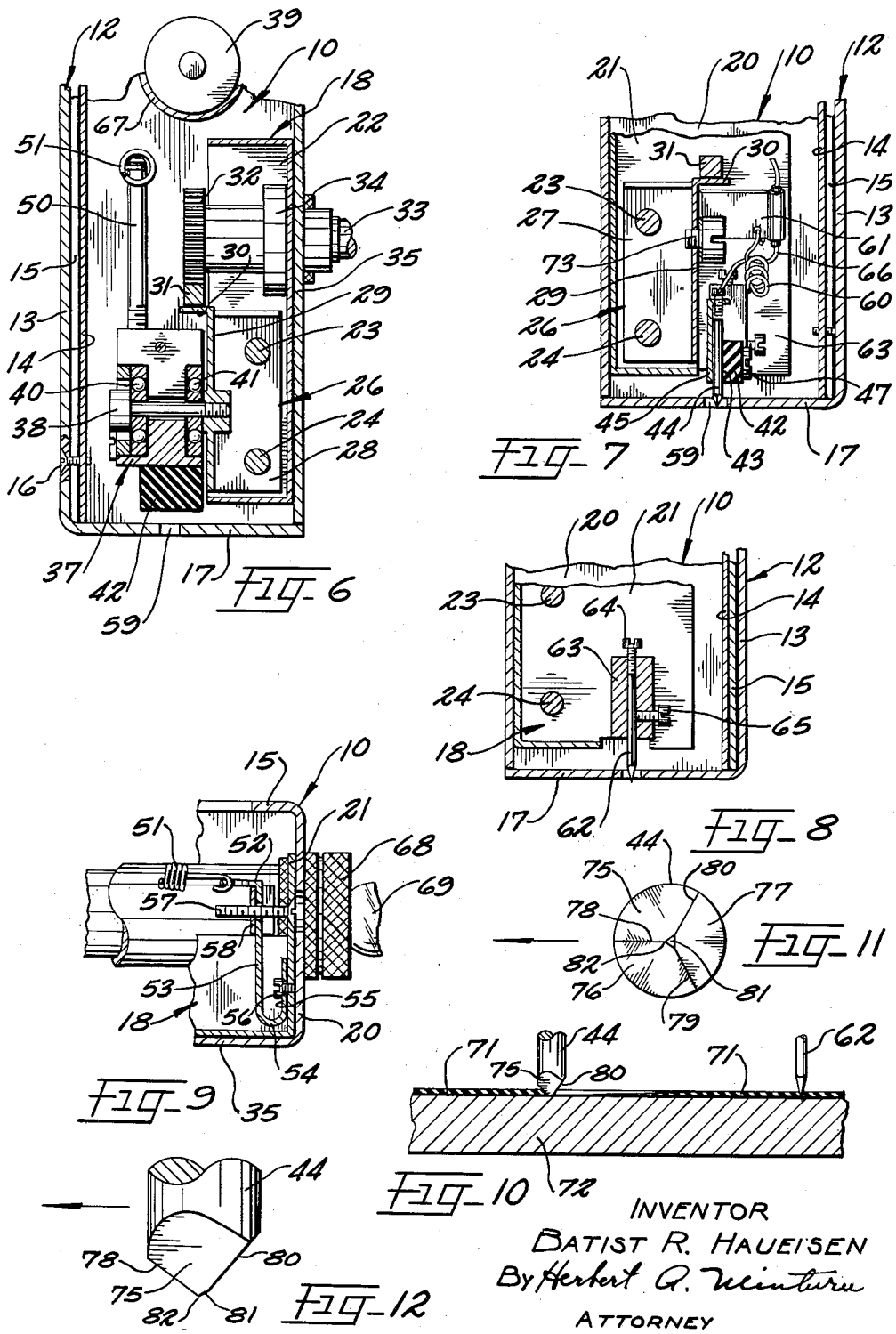

ically insulating coatings applied to conducting base materials. The invention em-
United States Patent Office 3,021,707
Patented Feb. 20, 1962

3,021,707
COATING SCRATCH RESISTANCE INDICATOR
Batist R. Haueisen, R.R. 1, Box 339,
New Augusta, Ind.
Filed Jan. 12, 1959, Ser. No. 786,213
6 Claims. (Cl. 73—150)

This invention provides an indication of the relative scratch resistance of electrically insulating coatings applied to conducting base materials. The invention embodies the principle of drawing an accurately pointed stylus over the coating surface with an increasing pressure applied to the stylus until the coating is penetrated and an electrical circuit is completed between the base and through the stylus with an electrical indicator of some nature, such as a lamp.

The stylus is caused to travel over the coating by the turning of a knob carrying a dial divided into a plurality of divisions. The end point of travel is indicated preferably by a small flashlight lamp when the stylus comes into contact with the base. The relative scratch abrasion resistance is then read from the dial.

The relative scratch or abrasion resistance as indicated by the position of the dial at the time that the coating is completely penetrated by the stylus and the lamp glows is not a quantity which can be defined readily. This presents the same situation as in the hardness measurements made by Martens, Bierbaum, or other known methods where the width of a scratch made with an accurately defined stylus point under a known constant load is used as a parameter of a hardness scale. Hard brittle materials chip or shatter when scratched with a sharp edge. Tough materials may form ridged edges along the furrow. The behavior of plastic or resilient surfaces may be affected by the rate at which the scratch is made. Similar effects are encountered when such different materials are tested by static methods such as the diamond pyramid or Rockwell indentation hardness testers.

In the case of the scratch hardness testers, the thickness of the test material, such as the coating or coatings, is not of importance, provided that it is sufficient to prevent effects due to the possibly softer base materials. In the present case, the test material or coating must be penetrated to the base, and there is always a region where the deformation of the base metal becomes a factor.

The readings obtained by the present device by scratching through a coating reflects both the thickness of the coating and its hardness, and to a limited extent, the hardness of the base material. In the present disclosure, no attempt is made to have the readings indicate quantitatively by numbers the intrinsic hardness and thickness of the test coating. This will require further study to obtain sufficient data to justify such direct readings and it is therefore recommended that the present invention be employed principally as a comparator within selected ranges.

On the other hand, if it is desired to correlate the readings obtained by the structure of the present invention with actual performance records under identical conditions of intended usage, that may be done.

For monitoring anodizing quality it is suggested that satisfactory preliminary samples or previous production parts be retained as standards and compared with subsequent production as often as experience dictates. Where specifications of a coated base metal requires a minimum thickness film, the original samples may be evaluted in accordance with ASTM procedures either by microscopic measurement of coating cross-section or determining coating weight per unit area. Because pore density or hardness of anodic coatings can vary over wide limits depending upon such factors as bad temperatures, current density or solution composition, the present device readings will be a function of coating thickness only when anodizing conditions are identical. The base metal alloy composition can also affect the qualities of the coating. The same considerations apply to test results obtained with other comparison methods such as voltage breakdown, oscillator "skin effect" devices and air or wheel abrasion methods.

The structure embodying the present invention is embodied in a pocket size unit weighing around one and one-quarter pounds. No external electrical connections are required and there is no electrical hazard due to the fact that but a single flashlight cell may be employed. The structure is intended for use under adverse shop or field conditions to give many hundreds of checks before a renewal of the stylus may be required. The structure may be employed to test most architectural anodized coatings, and also may give sufficient sensitivity to distinguish small differences in very thin coatings such as may be used for some household appliance trims, simply by change of pressure springs.

A further important object of the invention is to provide a structure wherein the test may be made quickly, and determined promptly by the illumination of the lamp, all simply by holding the device stationary on the test piece and turning a knob.

Figure 5:
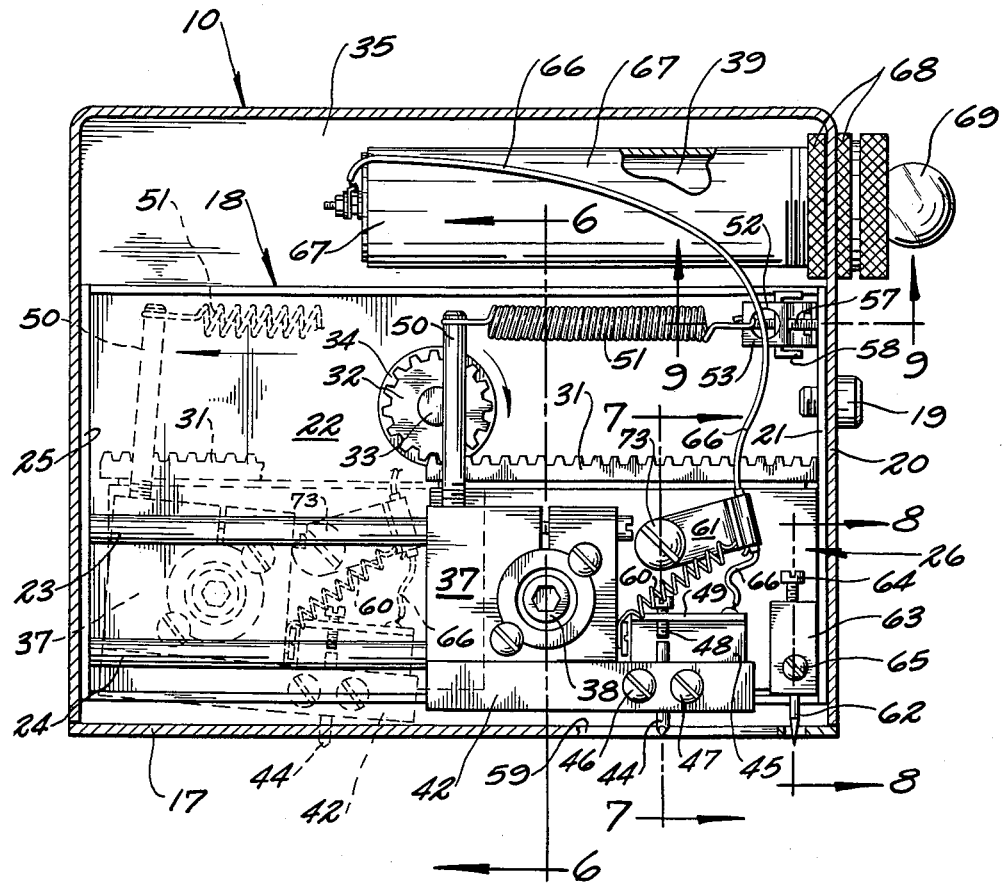

These and many other objects and advantages of the invention will become apparent to those versed in the art in the following description of the one particular form of the invention above indicated and as is illustrated in the accompanying drawings, in which FIG. 1 is a view in front elevation;
FIG. 2 is a view in rear elevation and partial section;
FIG. 3 is a view in end elevation;
FIG. 4 is a view in bottom plan;
FIG. 5 is a view in vertical section on the line 5—5 in FIG. 3;
FIG. 6 is a detail in vertical transverse section on the line 6—6 in FIG. 5;
FIG. 7 is a detail in transverse section on the line 7—7 in FIG. 5;
FIG. 8 is a detail in transverse section on the line 8—8 in FIG. 5;
FIG. 9 is a detail in longitudinal section on the line 9—9 in FIG. 5;
FIG. 10 is an operational view on an enlarged scale of the stylus penetrating a coating and making electrical contact with the base material;
FIG. 11 is a detail in bottom plan and on a further enlarged scale of the stylus shown in FIG. 10; and
FIG. 12 is a detail in side elevation of the stylus as shown in FIG. 11.

A housing 10 is provided with an opening 11 entirely over one side, FIG. 2, which opening 11 is normally closed by the cover 12. The cover 12 which may be of any suitable conformation and attached to the housing 10 in any desired manner is herein shown as consisting of an outer cover plate 13 interconnected with an inner securing plate 14, the cover plate 13 sliding externally over an inturned flange 15 around the margin of the opening 11 and the securing plate 14 sliding on the innerside of the flange 15. The two members 13 and 14 are then drawn one toward the other by means of screws 16 to clamp the flange 15 therebetween. For ease of assembly of parts to be carried in the housing 10, the housing 10 is opened across its underside as well as its side, and this underside is closed by means of a foot 17 extending integrally from the cover plate 13 across the under opening of the housing 10.

A sub-assembly generally designated by the numeral 18 is entered from the underside of the housing 10 and secured therein by any suitable means, herein shown as by a screw 19, this screw 19 passing through the end wall 20 of the housing 10 and screw-threadedly engaging a flange 21 of the sub-assembly frame 22.

The frame 22 carries a pair of spaced apart rods 23 and 24 fixed one in relation to the other by entering the flanges or end walls 21 and 25 of the frame 22.

A slide 26 is provided with a pair of end flanges 27 and 28 through which the rods 23 and 24 slidably extend with a close sliding fit. The slide 26 has a face member 29 joining the two end flanges 27 and 28 rearwardly of the rods 23 and 24.

The slide 26 has a forwardly turned flange 30 along the top edge of the face member 29, and on this flange 30 is fixed a length of a rack gear 31 in parallelism with the two rods 23 and 24. This rack gear 31 is in constant mesh with a spur gear 32 which is fixed on the end of a shaft 33 extending revolubly through a bearing 34 carried by the sub-frame 22 and extending therefrom through the front wall 35 of the housing 10. On the outer, front side of the wall 35, there is a combined knob and dial 36 adjustably fixed to the shaft 33. Thus by rotating the knob 36 externally of the housing 10, the slide 26 may be caused to reciprocate along the rods 23 and 24 in guided relation therewith.

A rocker head generally designated by the numeral 37 is rockably carried about a stud 38 in turn fixed to the rear face 29 of the slide 26, FIG. 6. Preferably the rocker head 37 is mounted on anti-friction bearings 40 and 41 carried by the stud 38.

A bar of insulating material designated by the numeral 42 is fixed in the present form to the under side of the rocker head 37 to extend from thereunder toward the housing wall 20. The forward side of the extending portion of this bar 42 is provided with a vertical groove 43 along which is laid a stylus 44. A metallic clamp 45 is brought up against the forward side of the stylus 44 compressively by means of a pair of screws 46 and 47 passing through the bar 42 and screw-threadedly engaging the clamp 45 which is in the nature of a plate, so that the stylus 44 may be adjusted vertically of the bar 42 and held electrically insulated from the rocker head 37. The clamp member 45 may carry an adjusting screw 48 in axial alignment with the stylus 44 for minute vertical adjustments of the stylus 44 before completing the tightening of the screws 46 and 47. This adjusting screw 48 is carried screw-threadedly through an overturned flange 49 extending from the top edge portion of the member 45.

A post 50 is secured to the rocker head 37, herein shown as extending from the upper side thereof. Also this post 50 is secured to that portion of the rocker head 37 which is on the opposite side of the mounting screw 38 from the housing wall 20. A coil spring 51 is engaged by one end to the uppermost part of the post 50, herein shown as being above the gear 32, FIG. 5, and its other end is secured to a tensioning member 52, FIG. 9. This tensioning member comprises a spring 53 in the nature of a leaf which is looped through the bend 54 to have a foot 55 in contact with the frame flange 21, secured thereto by means of the screw 56. A spring adjusting screw 57 revolubly passes through the frame flange 21, revolubly through an upper portion of the leaf spring 53, and screw-threadedly engages a plate 58 abutting the face of the spring 53 so that by suitable rotation of the screw 57, the spring 51 may be varied in tension by rocking the spring 53 relative to the flange 21. With the spring 51 under tension, the rocker head 37 will tend to be rocked in a clockwise direction, thereby lowering the stylus 44 relative to the housing bottom closure 17. This closure 17 is provided with a longitudinally disposed slot 59 therethrough, FIG. 4. The stylus 44 may be rocked through the slot 59, FIG. 5.

If the spring 51 is merely loosely positioned without applying any pull on the post 50, a second spring 60 is provided, this spring being fixed by one end to the rocker head 37 below the axis of the screw 38, and carried upwardly to a bracket 61 fixed to the face 29 of the slide 26, whereby the pull of this spring 60 tends to rock the rocker head 37 in a counter-clockwise direction so as to lift the stylus 44 and preferably carry the point thereof above the under side of the member 17. This spring 60 however is extremely light in nature, and is intended to be only of that strength whereby the weight of the rocker head 37 may be overbalanced by the spring 60 and thus effect the counter-clockwise direction of rotation of the head. In any event, the spring 60 will only rock the head 37 until that rocking is normally stopped by the presence of the spring 51 serving then as a stop link. Normally with the various parts in the positions indicated in FIG. 5, there will be no tension on the spring 51, that is, when the slide 26 is at its extreme right hand position (as viewed in FIG. 5) it will be in that position where the slide 26 is stopped by any suitable device, herein shown as by the end of the rack gear 31 abutting the flange 21.

A puncture stylus 62 is fixed in vertical alignment in a holder 63 which in turn is fixed to the frame flange 21 so that the holder 63 remains stationary in respect to the slide 26. The holder 63 in the present instance is a metallic block and the stylus 62 is a metallic needle, so that electrical conduction is afforded between the stylus 62 and the metallic frame 22. The stylus 62 is vertically adjustable in the holder 63 by means of an adjusting screw 64, the adjustment being held by means of a laterally extending screw 65 entering the holder 63 and abutting the stylus 62, FIG. 8.

The stylus 44 is an electrical conductor, and in the present form of the invention consists of a cylindrical rod of a hard grade of tungsten carbide accurately ground to form a point constituting the corner of a cube. For good comparator results, it is important that this point be sharp and free of nicks or other imperfections. A flat face of the cube is turned toward the fixed stylus 62. It is essential that this point of the stylus 44 be accurately ground.

The stylus 44 has the three faces 75, 76 and 77 intersecting respectively on the lines 78, 79 and 80. When the stylus 44 is to be employed to scratch through coatings ranging approximately from 0.0001 inch to 0.0013 inch, the otherwise normal point of intersection of the three lines 78, 79, and 80 is ground off as indicated in FIGS. 11 and 12 to provide a clearance or relief face 81 in a shape of a triangle with the three apices located respectively on the lines 78, 79, and 80. Thus, this relief face 81 provides a point 82, FIG. 12, at the lower end of the line 78. By employing this clearance or relief face 81, a very uniform series of readings may be obtained for coatings of like nature and thicknesses. Where the coating thickness is in what may be termed a low range of from 0.00005 inch to 0.0004 inch, it is not necessary to relieve the point of the stylus by a face 81. The angle of the face 81 to the horizontal, assuming the axis of the stylus 44 to be vertically disposed is substantially twenty-two degrees. It is important that all of the faces 75, 76, 77, and 81, be lapped to a high degree of polish. The stylus 44 is best operated when its axis is vertically disposed to the base material 72 as indicated in FIG. 10.

An electrical circuit is formed beginning with the stylus 44, through the clamp member 45, a wire 66 electrically connected to the member 45, herein shown as to the flange 49, and this wire 66 in turn is connected to a terminal of a metallic battery carrying housing or tube 67 which is mounted above the frame 22 by any suitable means, herein shown as being screw-threaded to receive a pair of lock nuts 68 thereon with the end wall 20 of the housing 10 intervening, the housing opening through that wall 20, and receiving detachably a lamp bulb 69 externally of the wall 20. The housing 67 is in direct metallic contact through the nuts 68 with the housing 10, and thus the electric circuit is continued through the wall 20, the flange 21, the holder 63, and the stylus 62. A battery 39 of the dry cell type, or of the mercury type, is carried within the housing or tube 67 to be an electrical contact between that housing and the lamp 69.

It is to be noted that the rocking of the head 37 in a clockwise direction as viewed in FIG. 5 is limited by reason of the head striking the screw 73 which holds the bracket 61, whereby, regardless of the length of travel of the slide 26 along the rods 23 and 24 away from the flange 21, the stylus 44 will be extended through the slot 59 by a limited length but slightly more than the thickness of the coating being scratched or cut through. The dash line positions of the elements show this rock limit position and the maximum extension of the stylus 44. While it has been indicated above that the slide 26 has a sliding fit between its flanges 27 and 28 and the rods 23 and 24, this fit is that whereby there is sufficient friction in the system to cause the slide to remain in any position along the rods 23 and 24 to which it may be shifted by turning the knob 36.

Operation

Normally the knob 36 will be in an inoperative position wherein the zero mark on the dial thereof will be slightly above the line indicator 70 which means that the rockable stylus 44 has its point lifted above the under surface of the member 17, or at least coinciding therewith when on the zero mark as indicated in FIG. 5. The housing 10 is placed on the surface to be checked, with the under closure 17 turned toward the surface. Pressure is placed on the top side of the housing 10 at the lamp end, that is above the wall 20, to cause the fixed stylus 62 to penetrate the coating, FIG. 10, the coating being designated by the numeral 71 on a base metal 72.

In reference to the "zero" position of the knob 36, when the zero on the dial coincides with the line 70, then if the device is placed upon a flat metal surface (uncoated) with the stylus 62 penetrating the metal, the lamp 69 should be lighted. If the lamp is not lighted, while pressing down on the housing 10, the adjusting screw 57 is turned to increase the tension on the spring 51 thereby forcing the stylus 44 down against the metal. When the lamp lights, the screw should be turned counter-clockwise to release some of the spring tension until that point is reached where the light is discontinued.

Proceeding with the operation, while firmly pressing the housing 10 toward the surface 71, the knob 36 is then rotated to carry the stylus 44 along the slot 59, until the lamp 69 illuminates and maintains a steady light. Erratic flashes of the lamp 69 can be had and are caused by pin holes or segregations of the coating, or even by the remnants of the last very thin layer of film which is pressed down into the groove being cut by the point of the stylus 44. The knob 36 should continue to be rotated until there is a steady glow had of the lamp. The first one or two of the flashes if there be such are to be disregarded.

When the steady glow is had, the check is completed, and the reading on the dial at the line 70 is taken. For comparison purposes, using a standard, for which the scratch test number is known for this particular type of machine, the results may then be compared by the newly obtained reading in conjunction with the standard reading.

The standard spring 51 normally supplied with the device will produce a maximum scratching pressure of approximately 1600 grams or about 16 grams per dial graduation. This is provided for testing anodized coatings, for example, but if sufficient sensitivity is not had, a lighter pull spring is provided.

Therefore it is to be seen that I have provided a very simple, but most effective mechanism for the purposes above indicated, and while I have described the one particular embodiment of the invention in detail, in the one particular form, it is obvious that structural variations may be employed without departing from the spirit of the invention, and I therefore do not desire to be limited to that precise form beyond the limitations which may be imposed by the following claims.

I claim:

1. For indicating thickness of a dielectric coating on an electrical conducting base, a structure comprising a housing having a slot through its underside; a slide; a slide guide carrying said slide and traversing said housing in parallel relation to said slot and to said underside; a rocker head rockably carried by said slide; a coil spring interconnecting by one end with said head and by the other end with said housing tending to rock said head upon movement of the slide away from said other spring end; an electrically conducting stylus carried by said head to one side of the axis of rocking of the head toward said other spring end, and directed by a free end into said slot; means shifting said slide along its said guide stretching said spring and tending to carry said stylus increasingly through said slot; a second electrical conducting stylus fixedly carried by said housing and extending from the housing underside adjacent an end of said slot; a second tension spring retaining said head in an up position of said stylus carried by the head; said first spring having an initial zero tension less than that of said second spring; said first spring overcoming the tension of the second spring as said slide travels from said zero tension under the influence of said shifting means; and an electric lamp and source of electric energy carried by said housing in series circuit with both of said styluses, said circuit being closed by bridging of said styluses extending through said coating into contact with said base.

2. The structure of claim 1 in which said first stylus consists of tungsten carbide having a point defined by a corner of a cube with a flat face thereof sloping upwardly from the point opposing the direction of travel of the stylus under increasing tension of said coil spring.

3. The structure of claim 1 in which said slide shifting means comprises a rack gear fixed to said slide, a pinion gear in constant mesh with the rack gear, a knob carried by the pinion gear, and a dial carried by the knob indirectly indicating by indicia thereon the degree of tension induced in said spring upon coating penetration travel of said first stylus.

4. A scratch resistance indicator for testing a dielectric coating on a conducting base, comprising a frame; a slide member; means carried by the frame slidingly supporting said member; a rocker carried by said member; an electrical conducting stylus carried by said rocker; spring means between said rocker and said frame normally positioning said rocker and stylus in a zero position with the member toward one end of the frame and yieldingly rocking the stylus to an extended position from said frame upon travel of said member from said position; a second conducting stylus fixedly carried by said frame; means shifting said member along its said supporting means and indicating the amount of shifting of the member; an electrical indicator; a source of indicator energizing current; and circuit means between said rockable stylus, said energy source, said indicator, and said fixed stylus, said circuit being completed between the two styluses through said base when the fixed stylus initially punctures the coating to be in contact with said base and the rockable stylus cuts through the coating upon being carried therealong by said member shifting means and therethrough by said spring means; said rockable stylus consisting of tungsten carbide having three faces of a cube intersecting and directed inwardly and downwardly one in respect to the other, the face intersecting lines terminating in a relief area triangularly shaped and the apices of which lie respectively on said lines of intersection; one apex being on one line of cube face intersection, said one line being centerally disposed on the side of the rockable stylus in respect to the direction of travel of the stylus in cutting through said coating, and the axis of the stylus being approximately vertically disposed to the conducting base, said relief face being disposed at an angle of approximately twenty-two degrees from said base.

5. A portable indicator for checking resistance of a dielectric coating on a piece of metal comprising a frame; a slide carried by the frame; a guide member carrying and confining said slide to reciprocation therealong in a direction parallel to said metal; a rocker head rockably mounted on said slide about a pivot axis; a coil spring interconnecting with said head to one side of said axis and said frame; a stylus fixed to said head on a side opposite from said one side to rock with said head downwardly under pull of said spring; a second stylus fixed to said frame and extending downwardly; a source of electric current; an electric indicator; a circuit including said indicator; said current source, and said two styluses; means moving said slide along said guide member from one frame side toward an opposite frame side tensioning said spring; an indicator operated by said moving means indicating by distance of travel of said slide in opposition to said spring a comparative reading for definite coating thickness; said circuit being closed between said fixed stylus and said head carried stylus upon said indicator as a whole being pressed and held stationary against said metal in turn held in a fixed position relative to the frame to have the fixed stylus penetrate the metal coating and said head stylus cut through the coating to the metal under the influence of said spring, the head stylus being shifted by said slide moving means.

6. A scratch resistance indicator device for checking a dielectric coating on a conducting base, comprising a frame; a pair of spaced apart slideways parallel to the base of said frame; a slide engaging said slideways shiftable therealong; a rocker pivoted to said slide on an axis providing up and down rocking of the rocker; a conducting stylus fixed on and insulated from said rocker to one side of said axis and having a point directed substantially vertically downwardly; a second electrical conducting stylus spaced from and fixed to said frame to extend substantially vertically downwardly therefrom; a spring fixed by one end to said rocker to its side opposite the first stylus with said axis intervening between those sides; said spring being fixed by its other end to said frame; a bottom on said frame below which both of said styluses normally extend; a second spring opposing said first spring and initially holding said first stylus above said bottom; a rack gear carried by said slide; a pinion gear in constant mesh with said rack gear; a dial member interconnected by said pinion gear; means for rotating the dial member; said dial member carrying indicia therearound indicating travel thereby of said slide and increasing of said first spring tension; a source of current; an electric flash indicator; said two styluses, flash indicator, and current source being in a series circuit closed through said base upon both styluses penetrating said coating causing said indicator to flash; said coating being penetrated by said second stylus by pushing said device firmly downwardly and retaining it against said base in a stationary position, and, upon rotating said dial member, carrying said first stylus through said coating to base contact.

References Cited in the file of this patent

UNITED STATES PATENTS

| | | |
|---|---|---|
| 1,768,639 | Shore et al. | July 1, 1930 |
| 2,333,640 | Clark | Nov. 9, 1943 |
| 2,372,662 | Dewey | Apr. 3, 1945 |
| 2,373,200 | Simmons et al. | Apr. 10, 1945 |
| 2,530,257 | Marcus | Nov. 14, 1950 |
| 2,567,333 | Gogan | Sept. 11, 1951 |
| 2,801,540 | Rondeau | Aug. 6, 1957 |
| 2,853,875 | Alderuccio et al. | Sept. 30, 1958 |
| 2,890,585 | Albrecht | June 16, 1959 |

FOREIGN PATENTS

| | | |
|---|---|---|
| 153,578 | Great Britain | Feb. 6, 1922 |
| 515,140 | Great Britain | 1939 |